Jan. 22, 1957     V. A. HOOVER     2,778,239
MECHANICAL ACTUATOR
Filed April 6, 1953

INVENTOR.
VAINO A. HOOVER.
BY Fulwider, Mattingly & Babcock
Attorneys

United States Patent Office 2,778,239
Patented Jan. 22, 1957

2,778,239

MECHANICAL ACTUATOR

Vaino A. Hoover, Los Angeles, Calif.

Application April 6, 1953, Serial No. 347,136

6 Claims. (Cl. 74—424.8)

The present invention relates generally to the field of mechanisms, and more particularly to an improved mechanical actuator of the relatively rotatable screw and nut type.

The relatively rotatable screw and nut type of mechanical actuator is widely used in many industrial applications. This type of mechanical actuator essentially comprises an externally threaded screw of uniform diameter which is threadably engaged with an internally threaded nut whereby relative rotation of these two members will effect their relative axial movement. Ordinarily, the nut member is mounted within a frame so as to be locked against other than rotational movement while the screw member is connected to the device which is to be actuated in a direction parallel to the longitudinal axis of the screw. Rotation is then imparted to the nut member whereby the screw member will be moved along its axis relative to the frame.

This type of mechanical actuator is particularly adapted for use in moving the cockpit canopy of an airplane between an open and closed position. When so utilized, it will be apparent that inadvertent jamming of the screw member within the nut member must be carefully avoided in view of the serious consequences such jamming could easily entail. Heretofore, in order to minimize the danger of inadvertent jamming, such mechanical actuators have been constructed with a nut member of appreciable length, which nut member was formed with internal threads along substantially its entire length for engaging the threads of the screw member. It will be apparent that such nut members were difficult and expensive to machine, and that they offered considerable frictional resistance to relative rotation of the screw member, especially when the latter was subjected to a transversely-directed load.

It is a major object of the present invention to provide a novel mechanical actuator of the relatively rotatable screw and nut type which affords considerable resistance against the inadvertent jamming of the screw member within the nut member, yet which does not incorporate a nut member requiring extensive machining and wherein the nut member does not offer appreciable resistance to relative rotation of the screw member. This object is made possible by the use of a novel nut member which is threaded for only a portion of its length, together with unique guide means for restraining transverse deflection of the screw member under the influence of transversely-directed loads.

Another object of the present invention is to provide a mechanical actuator which is light in weight.

It is a further object of the present invention to provide a mechanical actuator which is simple of design and incorporates a minimum number of parts whereby it may be fool-proof in operation and have a long and trouble-free service life.

Yet another object of the present invention is to provide a mechanical actuator which may be readily incorporated with a driving motor for the rotation of the nut member whereby an integral, compact and rugged assembly results.

Other objects and advantages of the present invention will become apparent from the following detailed description of a preferred embodiment thereof, taken in conjunction with the appended drawings, wherein.

Figure 1:
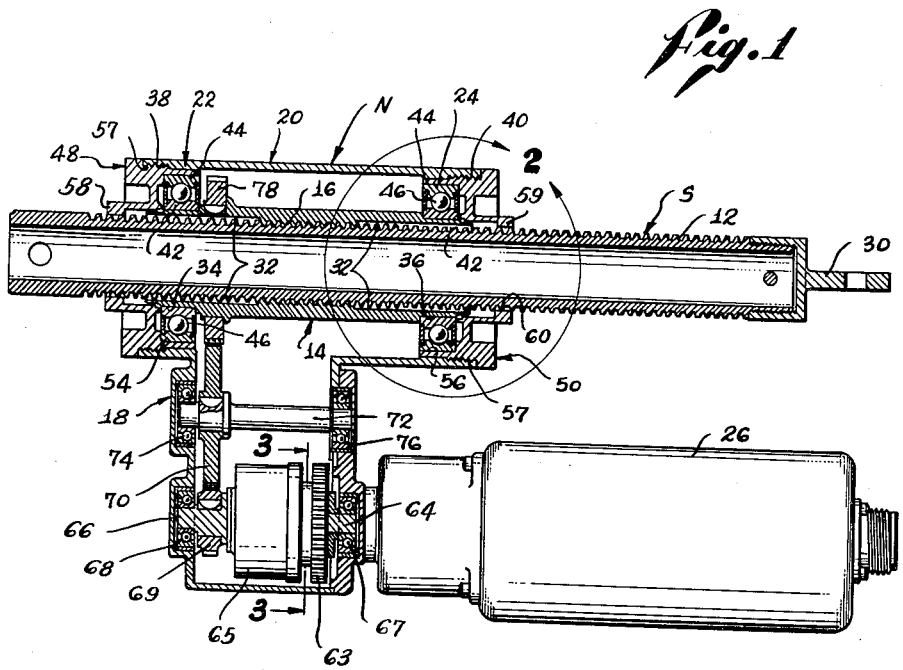
Fig. 1 is a side view, primarily in section, taken along the central vertical axis of a preferred form of mechanical actuator embodying the present invention.

Referring to the drawings, and particularly Fig. 1 thereof, the preferred form of mechanical actuator embodying the present invention broadly comprises an elongated actuating screw member S, which screw member is threadedly engaged with a nut member N. The nut member will preferably take the form of a drive sleeve, generally designated 14, and formed with internal threads 16 only at its intermediate portion. The drive sleeve 14 is shown supported by a frame, generally designated 18, which includes a support cylinder 20. The drive sleeve 14 is coaxial with and concentric to the support cylinder 20. Bearings 22 and 24 are interposed between the support cylinder 20 and the ends of the drive sleeve 14. The drive sleeve is adapted to be rotated by means of a power source 26 shown mounted by the lower portion of the frame 18, which power source is connected to the drive sleeve by suitable gearing. Upon rotation of the drive sleeve 16, the actuating screw S will be moved axially relative to the frame 18.

The screw member S is shown as mounting an anchor element 30, which element is connectable to the article which is to be actuated (not shown). As disclosed in Fig. 2, the external diameter of the threads 12 of the screw member is less than the inside diameter of the end portions of the drive sleeve 14 whereby a clearance 32 exists therebetween. It should be noted that the extreme end portions of the drive sleeve 14 are each formed with external circumferential recesses 34 and 36, respectively.

The support cylinder 20 is shown as being slightly longer than the driving sleeve 14 and as having internal threads 38 and 40 formed at its ends. The bearings 22 and 24 are preferably of ball-bearing type having inner races 42, outer races 44, and balls 46. Conveniently, the inner races of these bearings will have a press fit relative to the drive sleeve recesses 34 and 36. The drive sleeve is shown rotatably carried between these bearings by means of retainers 48 and 50. To this end the retainers are shown formed with circumferential recesses 54 and 56 adapted to be received by the outer races of the bearings. Additionally, each retainer may be formed with threads 57 engageable with the threads 38 and 40 of the support cylinder 20. With this arrangement, the drive sleeve 14 will be supported by its ends at points axially spaced from its internal threads 16. Hence, the drive sleeve will be rigidly braced against deflection relative to its longitudinal axis, which deflection, if permitted, would tend to cause binding between the threads of the drive sleeve and those of the screw member S.

Figure 2:
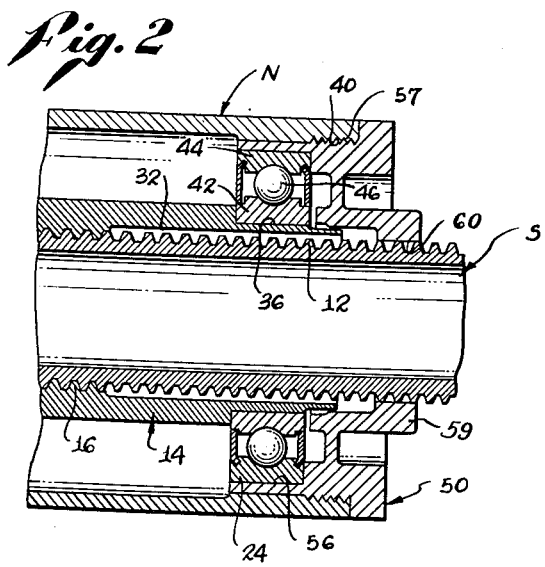
Fig. 2 is a fragmentary enlarged view showing in detail the encircled portion designated 2 in Fig. 1.
Figure 3:
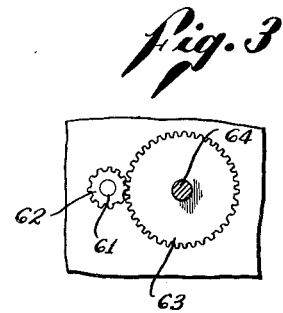
Fig. 3 is a fragmentary cross sectional view taken substantially as indicated by the line 3—3 in Fig. 1.

The preferred form of retainers 48 and 50 will include guide means in the form of integral guide collars, designated 58 and 59, respectively. These guide collars are coaxial with the screw member S, drive sleeve 14, and the support cylinder 20. Referring to Fig. 2, the bore 60 of each collar is adapted to have axial sliding engagement with the outer edges of the threads 12 of the screw member. With this arrangement, transverse deflection of the screw member under the influence of transversely directed loads thereon will be effectively restrained. Accordingly, these guide collars will afford considerable resistance against inadvertent jamming of the screw member S within the drive sleeve 14.

The power source 26 may conveniently comprise a conventional electric motor having a drive shaft 61 disposed parallel to screw member S. One end of this motor is shown rigidly affixed to the stationary frame 18. The motor's drive shaft 61 carries a pinion gear 62, which is driveably engaged with a driver gear 63 secured to a shaft 64. Shaft 64 is connected by a torque limiting means 65 to a shaft 66 coaxially disposed with respect to shaft 64, shafts 64—66 being rotatably supported by suitable bearings 67 and 68.

A pinion gear 69 is secured to the shaft 66 and meshed with a gear 70 carried by a counter-shaft 72. The counter-shaft 72 is mounted by the frame 18 between a pair of ball bearings 74 and 76, and is disposed parallel to the motor drive shaft and the screw member S. The gear 70 is shown meshed with another gear 78 rigidly mounted by the outside of the drive sleeve 14.

The torque-limiting means 65 is interposed between the motor 26 and the drive sleeve 14 to limit the torque which may be applied to the drive sleeve 14. Thus, in the event the force required to move the screw member S becomes excessive, damage which might otherwise be caused to the elements interconnecting the screw member and the motor is avoided.

It will be apparent that the construction shown and described herein provides a foolproof, rugged and efficient relatively rotatable screw and nut type mechanical actuator. The provision of a nut member in the form of a drive sleeve which is threaded only at its mid-portion, yet which is rigidly supported at its ends within axially spaced-apart bearings, together with a screw member which is effectively restrained against transverse deflection by guide collars positioned adjacent the ends of the drive sleeve results in an actuator of this nature which will not easily become jammed even under the most adverse operating conditions. Moreover, since the drive sleeve is threaded only for a small portion of its length, its threads will offer a minimum amount of frictional resistance to the relative rotation therewithin of the threads of the screw member. It should be further noted that the incorporation of the afore-described mechanical actuator with the motor 26 and the torque-limiting means 65 within an integral frame results in a light and compact assembly especially adaptable for use in the aircraft industry.

It should likewise be observed that although the specific embodiment herein shown and described is fully capable of providing the advantages and achieving the objects previously mentioned, such embodiment is merely illustrative and other modifications and changes may be made without departing from the spirit of the invention or the scope of the appended claims.

I claim:

1. A mechanical actuator, comprising: an externally threaded actuating screw; a coaxial drive sleeve surrounding said screw; a frame; and bearing means interposed between said frame and the end portions of said sleeve for rotatably supporting said sleeve upon said frame, said sleeve having internal threads along a small fraction of the length of said sleeve at a location intermediate the ends thereof, said internal threads being engaged with the threads of said screw, whereby to effect axial movement of said screw in response to rotation of said sleeve, the bore in said sleeve on opposite sides of said internal threads having a diameter exceeding the maximum diameter of the threads on said screw.

2. A mechanical actuator according to claim 1 which includes power means connected to said frame; motion transmitting means connecting said power means to said sleeve, whereby said sleeve may be rotated to effect said axial movement of said screw; and torque limiting means interposed in said transmitting means between said power means and said sleeve.

3. A mechanical actuator according to claim 1 which includes coaxial guide collars encircling said screw mounted by said frame at points spaced outwardly of opposite ends of said sleeve, said collars having a smooth bore providing a bearing surface in axial sliding engagement with said screw to thereby restrain transverse deflection of said screw under the influence of transversely directed loads.

4. A mechanical actuator according to claim 3 which includes retainer means mounted by said frame for securing each of said bearing means, said coaxial guide collars being carried by said retainer means to so engage said screw outwardly of the ends of said sleeve.

5. A mechanical actuator according to claim 4 wherein said sleeve is provided with an external circumferential recess at each end, said actuator also including a coaxial support cylinder encompassing said sleeve, the ends of said cylinder being formed with internal threads, said coaxial retainers being threaded into each end of said cylinder, said retainers each including a circumferential recess in substantial radial alignment with the circumferential recess formed in the corresponding end of said sleeve, said bearing means comprising a pair of ball bearings, the outer races of said ball bearings being disposed in the circumferential recess formed in said retainers, and the inner races of said ball bearings being secured in the circumferential recesses formed in said sleeve.

6. A mechanical actuator according to claim 5 which includes: a motor mounted by said frame having a drive shaft parallel to said screw; a pinion gear connected to said drive shaft; a driven gear secured to said sleeve; a second shaft mounted by said frame parallel to said drive shaft; and a gear carried by said second shaft, said gear being meshed with said pinion gear and said driven gear, whereby said sleeve may be rotated and axial movement of said screw relative to said frame may thereby be effected.

References Cited in the file of this patent

UNITED STATES PATENTS

| | | |
|---|---|---|
| 2,320,353 | Ernst | June 1, 1943 |
| 2,385,194 | Carroll | Sept. 18, 1945 |
| 2,446,393 | Russell | Aug. 3, 1948 |
| 2,531,109 | Chapman | Nov. 21, 1950 |
| 2,660,026 | Geyer | Nov. 24, 1953 |
| 2,660,027 | Geyer | Nov. 24, 1953 |